(12) United States Patent
Lee et al.

(10) Patent No.: US 10,060,488 B2
(45) Date of Patent: Aug. 28, 2018

(54) ELECTROMECHANICAL BRAKE FOR VEHICLE

(71) Applicants: Hyundai Motor Company, Seoul (KR); Hyundai Mobis Co., Ltd., Seoul (KR)

(72) Inventors: Joung Hee Lee, Gyeonggi-do (KR); Dong Yoon Hyun, Seoul (KR); Jong Yun Jeong, Gyeonggi-do (KR); Jong Sung Kim, Seoul (KR); Yong Sik Kwon, Seoul (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/365,317

(22) Filed: Nov. 30, 2016

(65) Prior Publication Data
US 2017/0321771 A1 Nov. 9, 2017

(30) Foreign Application Priority Data
May 4, 2016 (KR) .................. 10-2016-0055065

(51) Int. Cl.
*F16D 65/00* (2006.01)
*F16D 55/226* (2006.01)
(Continued)

(52) U.S. Cl.
CPC ....... *F16D 65/0068* (2013.01); *F16D 55/226* (2013.01); *F16D 65/18* (2013.01);
(Continued)

(58) Field of Classification Search
CPC .... F16D 65/0068; F16D 65/18; F16D 55/226; F16D 2121/24; F16D 2125/40; F16D 2055/0016
(Continued)

(56) References Cited

U.S. PATENT DOCUMENTS 4,022,300 A * 5/1977 Afanador .............. F16D 55/224
188/71.9
7,316,300 B2 1/2008 Danne et al.
(Continued)

FOREIGN PATENT DOCUMENTS

JP 2006-349189 A 12/2006
JP 2007-100725 A 4/2007
(Continued)

*Primary Examiner* — Thomas J Williams
*Assistant Examiner* — Mariano Sy
(74) *Attorney, Agent, or Firm* — Mintz Levin Cohn Ferris Glovsky and Popeo, P.C.; Peter F. Corless

(57) ABSTRACT

An electromechanical brake includes a piston installed in a caliper housing so as to be movable forward and backward in an axial direction, and moves forward in the axial direction at the time of performing a braking operation so as to press a friction pad provided to clamp a disc; an actuator which provides rotational force for moving the piston; a spindle which is thread-coupled to the piston, and rotates by rotational force transmitted from the actuator to move the piston forward and backward in the axial direction; and a guide member which is provided to be integrally fixed to the caliper housing and coupled to the piston so as to restrict rotation of the piston and guide forward and backward axial movement of the piston, in which the guide member has a support portion which is coupled to the spindle and supports the spindle in the axial direction.

18 Claims, 12 Drawing Sheets

(51) Int. Cl.
*F16D 65/18* (2006.01)
*F16D 55/00* (2006.01)
*F16D 121/24* (2012.01)
*F16D 125/40* (2012.01)
*F16D 125/06* (2012.01)

(52) U.S. Cl.
CPC .. *F16D 2055/0016* (2013.01); *F16D 2121/24* (2013.01); *F16D 2125/06* (2013.01); *F16D 2125/40* (2013.01)

(58) Field of Classification Search
USPC .................. 188/72.1, 156, 157, 162, 71.9
See application file for complete search history.

(56) References Cited

U.S. PATENT DOCUMENTS

| | | | | |
|---|---|---|---|---|
| 2009/0211858 A1* | 8/2009 | Leiter | ............ | B60T 7/107 188/265 |
| 2012/0145491 A1* | 6/2012 | Hyun | ............ | F16D 55/226 188/71.8 |
| 2012/0325597 A1* | 12/2012 | Giering | ............ | F16D 65/14 188/72.3 |
| 2015/0233434 A1* | 8/2015 | Hayashi | ............ | F16D 65/0006 188/72.6 |
| 2015/0274139 A1* | 10/2015 | Okada | ............ | B60T 8/17 701/70 |
| 2015/0300433 A1* | 10/2015 | Yasui | ............ | F16D 65/18 188/162 |
| 2016/0137181 A1* | 5/2016 | Shim | ............ | B60T 13/741 303/15 |
| 2016/0144842 A1* | 5/2016 | Jeon | ............ | B60T 13/741 303/15 |

FOREIGN PATENT DOCUMENTS

| | | | |
|---|---|---|---|
| JP | 2007205400 A | * | 8/2007 |
| JP | 2011-213205 A | | 10/2011 |
| JP | 2014-214752 A | | 11/2014 |
| KR | 2005-0024881 A | | 3/2005 |
| KR | 10-2012-0060069 A | | 6/2012 |
| KR | 10-1562884 B1 | | 10/2015 |

* cited by examiner

ELECTROMECHANICAL BRAKE FOR VEHICLE

CROSS-REFERENCE TO RELATED APPLICATION

This application claims under 35 U.S.C. § 119(a) the benefit of Korean Patent Application No. 10-2016-0055065 filed on May 4, 2016, the entire contents of which are incorporated herein by reference.

BACKGROUND (a) Technical Field

The present disclosure relates to an electromechanical brake for a vehicle, more particularly, to an electromechanical brake capable of exhibiting stable braking performance even when a system change occurs such as a disturbance applied to a pad or abrasion of the pad.

(b) Description of the Related Art

In general, a brake device for a vehicle is a device that generates braking force for decelerating or stopping a moving vehicle or maintaining the vehicle in a stopped state, and braking is carried out while kinetic energy of the vehicle is converted into thermal energy by mechanical friction when the vehicle decelerates and frictional heat is radiated into the atmosphere.

As the brake device for a vehicle, there are a drum type hydraulic brake, a disc type hydraulic brake, and the like, and the disc type hydraulic brake obtains braking force by strongly pressing friction pads (brake pads) against both surfaces of a disc, which rotates together with a wheel, instead of using a drum.

However, the hydraulic brake has a complicated structure because the hydraulic brake requires mechanical elements connected to a brake pedal in front of a driver seat, hydraulic piping, elements for controlling hydraulic pressure, and the like, and therefore, an electromechanical brake (EMB) has been developed and used to simplify a configuration of the brake device.

The electromechanical brake has been developed to be used as an electronic parking brake (EPB), but recently, a field of the electromechanical brake has been expanded such that the electromechanical brake is used as a main brake that is substituted for the hydraulic brake in the related art.

Unlike the typical hydraulic brake, the electromechanical brake refers to a brake that obtains braking force by pressing a friction pad by using a mechanical mechanism driven by an electric motor.

The typical electromechanical brake has an actuator including the electric motor that rotates forward and backward in order to perform the braking operation (press the friction pad) and release the braking operation (reduce pressure), and the electromechanical brake operates to press the friction pad using rotational force of the motor so that the friction pad presses the disc (causes friction with the disc) at the time of performing the braking operation.

Compared to the hydraulic brake, the electromechanical brake has a simple structure and a high response speed, and may be more precisely controlled, thereby improving braking safety.

The electromechanical brake is advantageous because braking force is easily controlled, and essentially used to implement a brake-by-wire (BBW) system.

Meanwhile, the electromechanical brake converts rotational force of the actuator into translational force so as to press the friction pad against the disc, and allow the friction pad to cause friction with the disc in a state in which the friction pad presses the disc, thereby generating braking force.

In this case, a spindle (also referred to as a screw) rotates, but a piston, which pushes the friction pad, does not rotate but needs to move straight, and as a result, there is required a structure which supports the piston such that the piston does not rotate but moves straight forward and backward in an axial direction.

In general, there is applied a structure in which a protrusion is formed on a rigid body of the friction pad, and a groove into which the protrusion is inserted is provided in the piston, such that the protrusion is inserted into and caught by the groove, and as a result, the piston cannot be rotated by the friction pad when the spindle rotates.

Alternatively, because precise control is not required in the case of an electromechanical brake for parking a vehicle, that is, in the case of the EPB instead of a typical electromechanical brake for braking a vehicle, a groove is formed in a surface of the piston which abuts on the friction pad, such that the rotation of the piston is prevented by increasing frictional force between the friction pad and the piston.

In accordance with regulations, the EPB needs to generate a predetermined or higher level of braking force even when the vehicle travels as well as when the vehicle is parked, and the EPB needs to be robustly designed so that stable performance may be outputted even though there occurs a system change such as abrasion of the friction pad and a disturbance transmitted when the vehicle travels.

In particular, in a case in which the electromechanical brake is applied as the typical main brake for braking a vehicle, it is necessary to minimize an influence of disturbance in order to precisely control braking force.

As known, in the case of the disc brake that generates braking force by using friction between the disc and the friction pad, the friction pad shifts toward the disc as the friction pad is abraded, and deflection of an angle occurs due to non-uniform abrasion of the disc and the pad as durability thereof is changed.

Because the pad is installed to have a predetermined clearance in order to reduce residual braking force (braking drag) and reduce vibration and noise when the braking operation is released, the pad moves in a rotational direction when the pad causes friction with the disc at the time of performing the braking operation.

In the case of a structure that restricts and supports the piston so as to prevent the rotation of the piston by using the protrusion of the pad, an additional rotation occurs about an axis of the protrusion at the time of performing the braking operation.

In a case in which the rotation of the piston is restricted by the pad like the related art, the movement of the pad in various directions is transmitted to components of the electromechanical brake through the piston as it is, and as a result, precise control cannot be carried out. The spindle and the piston are bent and axes are misaligned, and as a result, there are problems in that efficiency deteriorates and thus durability deteriorates.

It is also impossible to control braking force in a case in which the protrusion of the pad is separated from the piston, and in a case in which the protrusion of the pad is securely fixed to the groove of the piston in an interference-fit manner in order to prevent the problem, there is a problem in that maintainability deteriorates.

FIGS. 1A and 1B (RELATED ART) are views for explaining a disturbance that occurs on a friction pad of an electromechanical brake in the related art, and as illustrated in FIG. 1A, a pad 1 moves in various directions due to abrasion of the pad 1, an increase in pressure at the time of performing the braking operation, and a decrease in pressure at the time of releasing the braking operation, and deflection of an angle may occur due to non-uniform abrasion of a disc (not illustrated) and the pad 1.

As illustrated in FIG. 1B, the pad 1 may move leftward and rightward as the disc rotates, and the pad may rotate due to rotational force of a spindle.

Misalignment of axes in the electromechanical brake in the related art will be described in more detail with reference to FIGS. 2A and 2B (RELATED ART).

Reference numeral 2 indicates a contact surface of the friction pad 1 which comes into contact with the piston, reference numeral 3 indicates a protrusion of the friction pad 1, and reference numeral 4 virtually indicates a shape and a position of a groove of the piston into which the protrusion 3 of the friction pad 1 is inserted.

Reference numeral 5 indicates a torque member.

In an initial state, an axial center of the spindle and an axial center of the piston coincide with each other as illustrated in FIG. 2A, and as illustrated in FIG. 2B, misalignment of the axes occurs due to the rotation of the pad 1 at the time of performing the braking operation when the vehicle is stopped.

That is, the axial center of the piston and the axial center of the spindle may be misaligned.

The misalignment of the axes may become severe due to the rotation and the leftward and rightward movement of the pad 1 at the time of performing the braking operation while the vehicle travels.

The above information disclosed in this Background section is only for enhancement of understanding of the background of the disclosure and therefore it may contain information that does not form the prior art that is already known in this country to a person of ordinary skill in the art.

SUMMARY

The present disclosure provides an electromechanical brake capable of exhibiting stable braking performance even when a system change occurs such as a disturbance applied to a pad or abrasion of the pad.

In one aspect, the present disclosure provides an electromechanical brake including: a piston installed in a caliper housing so as to be movable forward and backward in an axial direction, and moves forward in the axial direction at the time of performing a braking operation so as to press a friction pad provided to clamp a disc; an actuator which provides rotational force for moving the piston; a spindle which is thread-coupled to the piston, and rotates by rotational force transmitted from the actuator so as to move the piston forward and backward in the axial direction; and a guide member which is provided to be integrally fixed to the caliper housing and coupled to the piston so as to restrict rotation of the piston and guide forward and backward axial movement of the piston, in which the guide member has a support portion which is coupled to the spindle and supports the spindle in the axial direction.

Therefore, the electromechanical brake according to the present disclosure may block a disturbance, and as a result, it is possible to facilitate precise control and output uniform performance.

Bending between the spindle and the piston (or the nut member) is prevented, and as a result, it is possible to reduce frictional force of the spindle and thus to improve efficiency of the actuator.

By enhancing the support of the spindle, rotational force of the actuator may be quickly transmitted, and thus a response speed may be improved.

Noise and vibration characteristics may be improved at the time of performing the braking operation, durability may be improved because durability of the system is improved, design modification and improved design may be easily carried out in various forms, and maintainability may be improved by omitting a pad protrusion.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1A:
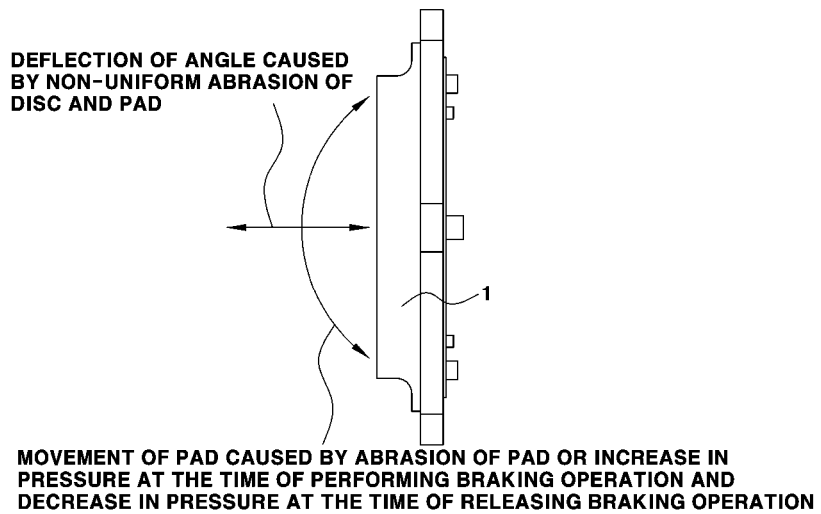
FIGS. 1A and 1B (RELATED ART) are views for explaining a disturbance that occurs on a friction pad of an electromechanical brake in the related art.
Figure 1B:
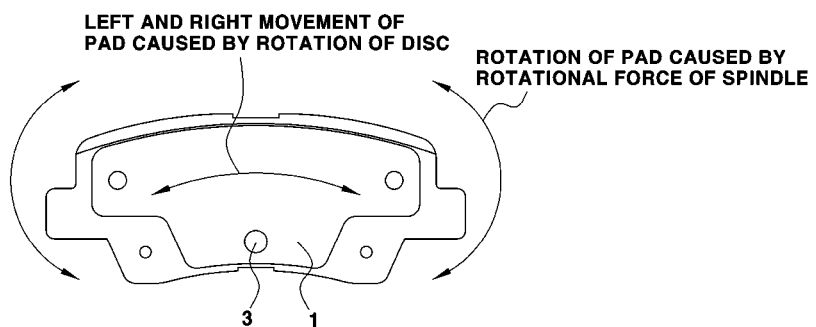
Figure 2A:
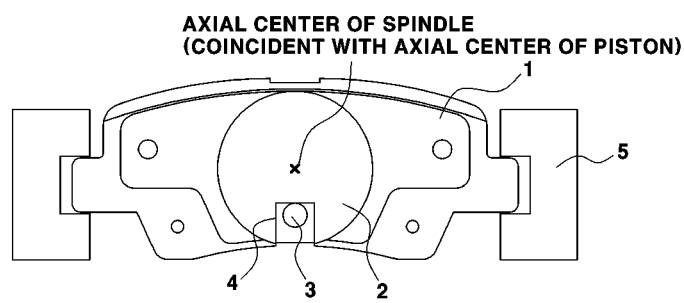
FIGS. 2A to 2C (RELATED ART) are views for explaining misalignment of axes in the electromechanical brake in the related art.
Figure 2B:
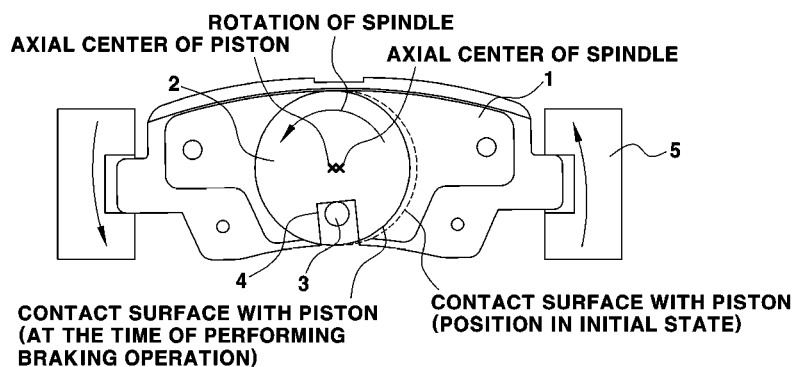
Figure 2C:
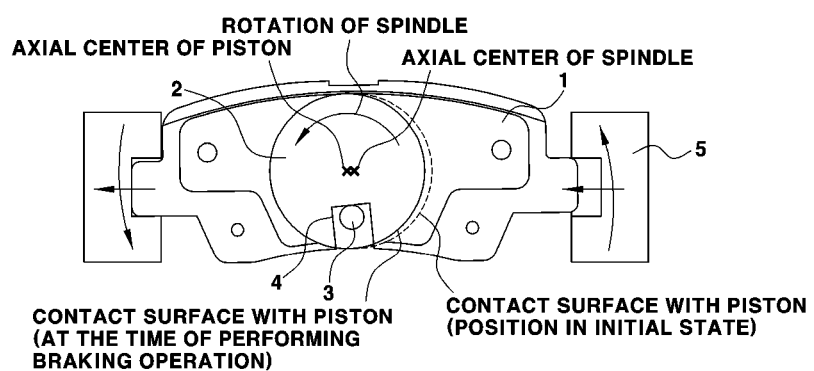

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail with reference to the accompanying drawings so that those skilled in the art to which the present disclosure pertains may easily carry out the exemplary embodiments. However, the present disclosure is not limited to the exemplary embodiments to be described below and may be specified as other aspects.

Figure 3:
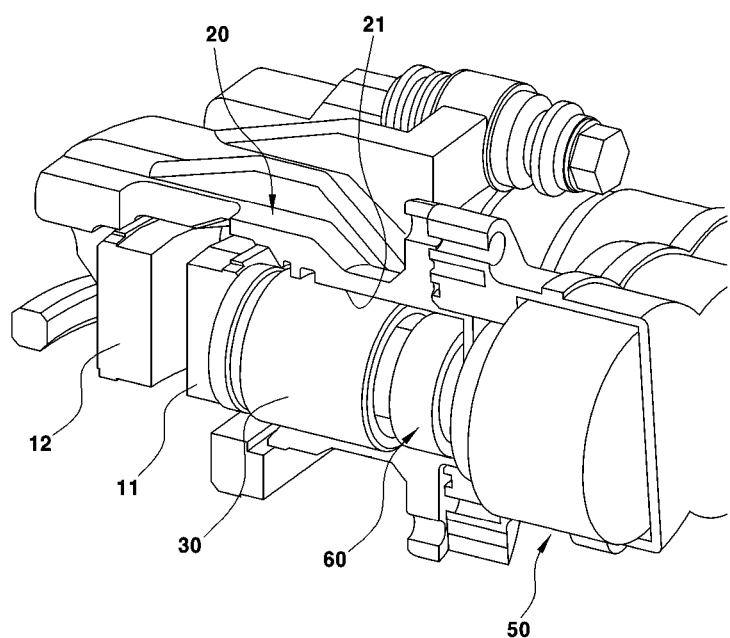
FIG. 3 is a perspective view of an electromechanical brake according to an exemplary embodiment of the present disclosure.
Figure 4:
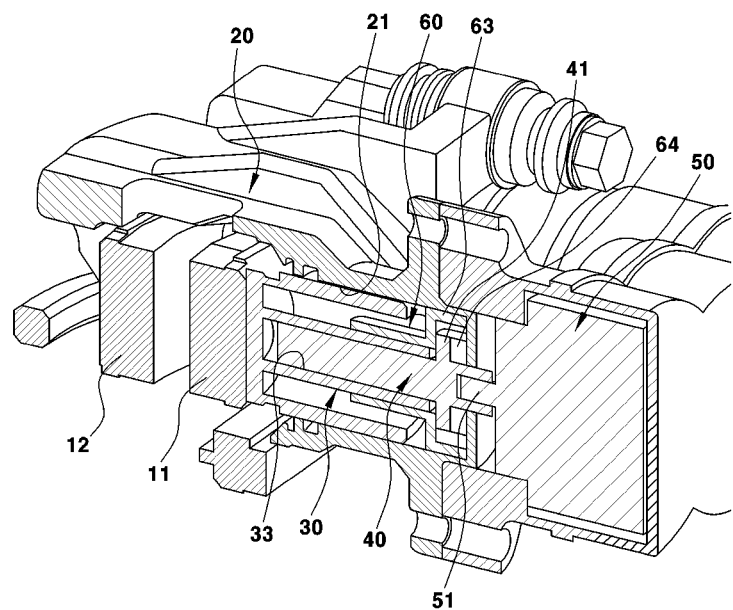
FIG. 4 is a cross-sectional view of an electromechanical brake according to an exemplary embodiment of the present disclosure.
Figure 5:
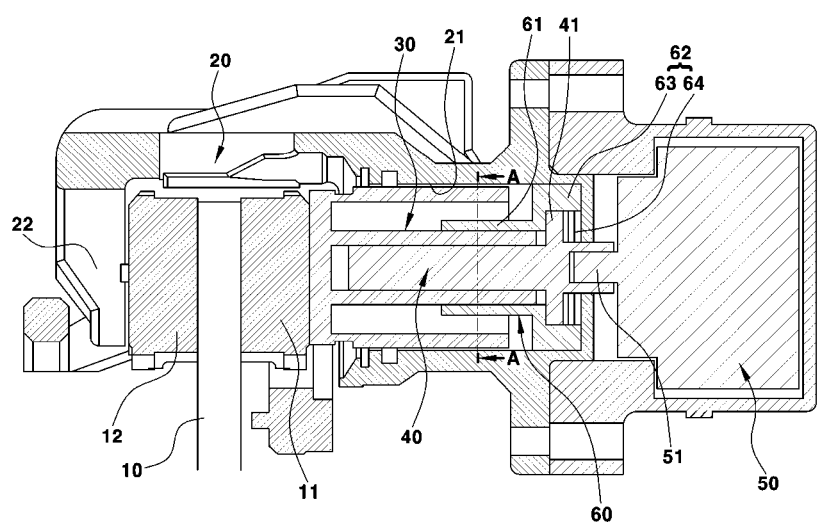
FIG. 5 is a cross-sectional view of the electromechanical brake according to the exemplary embodiment of the present disclosure.

FIGS. 3 and 4 are perspective and cross-sectional views, respectively, of an electromechanical brake according to an exemplary embodiment of the present disclosure, and FIG. 5 is a cross-sectional view of the electromechanical brake according to the exemplary embodiment of the present disclosure.

As illustrated, an electromechanical brake according to an exemplary embodiment of the present disclosure includes a carrier (not illustrated) which is fixedly installed on a vehicle body, and a caliper housing 20 which is coupled to the carrier so as to be movable forward and backward, and the carrier and the caliper housing 20 are disposed to surround one side of a disc 10 installed in a wheel of a vehicle.

In the carrier, a pair of friction pads (brake pads) 11 and 12, which presses both surfaces of the disc 10 that rotates together with the wheel of the vehicle, is installed to be movable forward and backward.

The pair of friction pads 11 and 12 is installed to be spaced apart from each other, and the disc 10 is disposed between the pair of friction pads 11 and 12. Therefore, when a piston 30 to be described below operates to move forward, the friction pads 11 and 12 move toward the disc 10 to cause friction with the disc and press the disc, thereby performing a braking operation.

The caliper housing 20 is slidably installed on the carrier, and has a cylinder 21 in which the piston 30 is installed.

That is, the hollow cylinder 21 is formed at one side of the caliper housing 20, and the piston 30 is installed in the cylinder 21 so as to be movable forward and backward.

The piston 30 moves forward to move one friction pad 11 of the pair of friction pads 11 and 12 forward toward the disc 10, such that the friction pad 11 causes friction with the disc 10.

In addition, a finger portion 22, which moves the other friction pad 12 forward toward the disc 10 so that the friction pad 12 causes friction with the disc 10, is formed at the other side of the caliper housing 20.

Therefore, the piston 30 moves forward toward the friction pads 11 and 12 and the disc 10 by force transmitted for braking and then presses the one friction pad 11 against the disc 10, and the caliper housing 20 moves in a direction opposite to the movement direction of the piston 30 by reaction force applied between the piston 30 and the one friction pad 11 such that the finger portion 22 of the caliper housing 20 presses the other friction pad 12 against the disc 10.

Therefore, the two friction pads 11 and 12 are pressed against both surfaces of the disc 10 at the same time.

In this case, the braking operation is performed by frictional force generated between the two friction pads 11 and 12 and the disc 10, and braking force is generated to restrict the wheel so that the wheel cannot be rotated by the frictional force.

Here, force, with which the piston 30 and the forger portion 22 of the caliper housing 20 press the friction pads 11 and 12 against both surfaces of the disc 10, may be referred to as clamping force of the caliper housing 20, and at the time of performing the braking operation (i.e., pressing the friction pads), reaction force, which is generated when the clamping force is applied, is applied to the piston 30 from the friction pads 11 and 12.

Meanwhile, the electromechanical brake according to the exemplary embodiment of the present disclosure includes a drive unit for moving the piston 30, and the drive unit includes a spindle 40 which is thread-coupled to the piston 30 installed in the cylinder 21 of the caliper housing 20 and rotates to move the piston 30 forward and backward in the axial direction (move the piston 30 straight forward and backward), and an actuator 50 which rotates the spindle 40 in order to perform the braking operation (press the friction pad) and release the braking operation (reduce pressure on the friction pad).

Here, the actuator 50 includes an electric motor (not illustrated separately) which generates rotational force for generating braking force, and a gear assembly (not illustrated separately) which is provided between a rotating shaft of the electric motor and the spindle 40 and transmits rotational force generated by the electric motor to the spindle 40.

In this configuration, the electric motor is a driving source which generates driving power, that is, rotational force for performing the braking operation (pressing) and releasing the braking operation (reducing pressure), and generates forward rotational force and reverse rotational force and provides the forward rotational force and the reverse rotational force to the spindle 40 through the gear assembly, and the electric motor rotates forward at the time of pressing the friction pad and rotates backward at the time of reducing pressure on the friction pad.

The operation of the electric motor is controlled by a controller (not illustrated), and the controller controls the forward and reverse operation of the electric motor.

The gear assembly is a constituent element that reduces a rotational speed of the electric motor, amplifies rotational force of the electric motor, and then transmits the rotational force to the spindle 40, and may be configured as a gear train including a combination of a plurality of gears.

Because the electric motor and the gear assembly are already being applied to the known electromechanical brake, a detailed description thereof will be omitted, but the spindle 40 is coupled to a shaft 51 of an output gear of the gear assembly which finally outputs rotational force of the electric motor.

In this case, when the spindle 40 is positioned in the cylinder 21, a rear end portion of the spindle 40 penetrates the caliper housing 20 inside the cylinder 21, extends to the outside of the caliper housing 20, and then is coupled to the shaft 51 of the output gear.

The piston 30 is installed so that the piston 30 cannot rotate in the cylinder 21 of the caliper housing 20 but may only move forward and backward in the axial direction, and as a result, when the spindle 40 rotates, the piston 30 thread-coupled to the spindle 40 moves forward and backward in the axial direction corresponding to the rotation direction and the rotation amount of the spindle 40.

A front end portion of the spindle 40 is coupled by being inserted into a hollow portion 33 of the piston 30, and in this case, an outer circumferential surface of the spindle 40 is thread-coupled to an inner circumferential surface of the piston 30 into which the spindle 40 is inserted.

To this end, screw threads are formed on the inner circumferential surface of the piston 30, and screw threads, which may be coupled to the screw threads of the piston 30, are formed on the outer circumferential surface of the spindle 40, such that the piston 30 moves forward and backward in the axial direction when the spindle 40 rotates.

That is, the spindle 40 is thread-coupled to the interior of the piston 30, and as a result, rotational force of the spindle 40 may be converted into forward and backward translational force of the piston 30.

Meanwhile, a guide member 60, which is coupled to the piston 30 inside the cylinder 21 so as to restrict the rotation of the piston but guide the forward and backward axial movement of the piston, is provided in the caliper housing 20.

The guide member 60 is a constituent element that prevents the rotation of the piston 30 but guides the piston 30 so that the piston 30 only moves forward and backward in the axial direction when the spindle 40 rotates.

The guide member 60 is positioned between the caliper housing 20 and the piston 30, and provided to be completely fixed to the caliper housing 20.

That is, a position of the guide member 60 itself is completely fixed to an inner surface of the cylinder 21 of the caliper housing 20 so that the guide member 60 can neither rotate nor move in the axial direction of the piston.

The guide member 60 is coupled by surrounding an outer surface of at least a part of the piston 30, in more detail, an outer surface of a spindle coupling portion of the piston 30, and to this end, the guide member 60 has a tubular (container) shape which may accommodate at least a part of the piston 30, and thus the piston 30 is positioned by being accommodated inside the guide member 60.

The piston 30 is coupled by being inserted into the guide member 60, and particularly, an inner surface of the guide member 60 and an outer surface of the piston 30 are coupled to each other so that the rotation of the piston 30 may be restricted but the forward and backward movement of the piston 30 may be guided.

A coupling portion 41, which is coupled to the guide member 60 so that the spindle 40 is supported in the axial direction inside the cylinder, is formed at the rear end portion of the spindle 40 positioned inside the cylinder 21 of the caliper housing 20, and a support portion 62, which supports the coupling portion 41 of the spindle 40 in the axial direction so that the coupling portion 41 is rotatable inside the cylinder 21 of the caliper housing 20, is provided on the guide member 60.

The coupling portion 41 and the support portion 62 are fixing structures which are provided to restrict the forward and backward axial movement of the spindle 40 inside the cylinder 21 of the caliper housing 20 and restrict the axial movement of the spindle 40 by supporting the spindle 40 in the axial direction.

The coupling portion 41 of the spindle 40 is formed in a shape that extends and protrudes in a radial direction from the rear end portion of the spindle, and in this case, the support portion 62 of the guide member 60 is coupled to the coupling portion 41 of the spindle 40 in both front and rear directions inside the cylinder 21 so as to axially support the coupling portion 41 of the spindle 40 in both front and rear directions.

To this end, the support portion 62 includes an accommodating portion 63 which is formed at the rear end portion of the guide member 60 so as to accommodate the coupling portion 41 of the spindle 40 and support the accommodated coupling portion 41 from the front side, and a bearing 64 which is disposed in the accommodating portion 63 and interposed between the inner surface of the caliper housing 20 (an inner surface of a rear end portion of the cylinder) and the coupling portion 41 of the spindle 40.

The accommodating portion 63 is a space portion which is enlarged in the radial direction from the inner surface of the rear end portion of the guide member 60, has a groove shape into which the coupling portion 41 of the spindle 40 may be inserted, and supports, from the front side, the coupling portion 41 of the spindle 40 inserted into the accommodating portion 63, such that the accommodating portion 63 provides a kind of catching projection structure by which the coupling portion 41 of the spindle 40 may be caught from the front side.

The bearing 64 is installed to support the coupling portion 41 of the spindle 40 in the cylinder 21 from the rear side so that the coupling portion 41 is rotatable.

As a result, the guide member 60 includes the container (tubular) shaped guide portion 61 which restricts the rotation of the piston 30 but guides the axial movement of the piston 30, and the support portion 62 which is fixed to the caliper housing 20 and restricts the forward and backward axial movement of the spindle 40 by means of the accommodating portion 63 and the bearing 64.

As described above, the support portion 62 of the guide member 60 includes the accommodating portion 63 and the bearing 64, and restricts the movement of the spindle 40 so that the guide member 60 and the spindle 40 may be disposed coaxially in the cylinder 21 of the caliper housing 20 by means of the accommodating portion 63 and the bearing 64.

Since the inner surface of the guide portion 62 of the guide member 60 is in direct contact with the outer surface of the piston 30, the piston 30 and the guide member 60 may be coaxially disposed.

The support portion 62 includes the groove-shaped accommodating portion 63 inside the guide member 60, and the coupling portion 41 of the spindle 40, which is inserted into the accommodating portion 63, has a structure enlarged in the radial direction, such that a stepped portion is formed between the inner surface of the guide portion 62 and the inner surface of the accommodating portion 63.

This stepped portion may implement a spindle support structure which may prevent warping of the spindle 40 and prevent the spindle 40 from being separated from the caliper housing 20.

The accommodating portion 63 of the guide member 60 is in direct contact with the coupling portion 41 of the spindle 40, such that swaying of an axis of the spindle 40 may be effectively prevented.

Figure 6A:
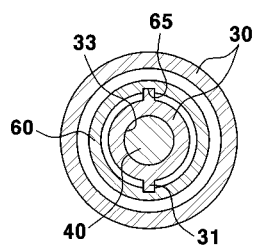
FIGS. 6A to 6C are cross-sectional views taken along line A-A of FIG. 5.
Figure 6B:
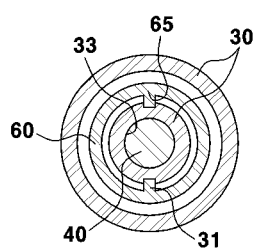

Meanwhile, FIGS. 6A to 6B are cross-sectional views taken along line A-A in FIG. 5. The guide portion 62 of the guide member 60, which restricts the rotation of the piston 30, is coupled to the piston 30, which is the corresponding component, by means of a guide structure having a protrusion and a groove.

The guide structure having the protrusion and the groove serves to allow the guide member 60 to guide the piston 30 so that the piston 30 moves forward and backward in the axial direction, and serves to restrict the rotation of the piston 30 so that the piston 30 does not rotate.

When viewed in cross section, the guide portion 62 of the guide member 60 and the piston 30 may have the same cross-sectional shape at any position in an axial section, and as illustrated in FIG. 6, the guide portion 62 of the guide member 60 and the piston 30 may be disposed approximately coaxially.

As an example of the guide structure, as illustrated in FIG. 6A, a groove 65, which is elongated in the axial direction (longitudinal direction) of the guide member 60, is formed in the inner surface of the guide member 60, and a protrusion 31, which may be inserted into the groove 65, is formed on the corresponding surface of the piston 30, such that the piston 30 may not rotate with respect to the guide member 60 because of the structure in which the protrusion 31 is inserted into the groove 65.

Alternatively, as another example of the guide structure, as illustrated in FIG. 6B, a protrusion 66 is formed in the inner surface of the guide member 60, and a groove 32, into which the protrusion 66 may be inserted, is formed in the corresponding surface of the piston 30 so as to be elongated in the axial direction (longitudinal direction) of the piston 30, such that the piston 30 may not rotate with respect to the guide member 60 in a state in which the protrusion 66 is inserted into the groove 32.

Figure 6C:
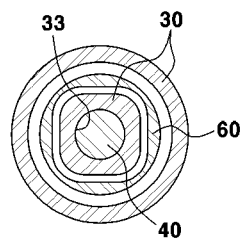

Otherwise, no separate guide structure is provided, and a structure in which components do not rotate relative to each other because of the shapes of the guide member 60 and the piston 30 may be applied, and in this structure, transverse cross sections of joint surfaces of the guide member 60 and the piston 30 have angled shapes instead of circular shapes, as illustrated in FIG. 6C.

That is, in a case in which the transverse cross-sectional shapes of the joint surfaces of the guide member 60 and the piston 30 are set to have at least two sides, among the sides, which form predetermined angles, the guide member 60 may restrict the rotation of the piston 30.

FIG. 6C illustrates an example in which the transverse cross sections of the two joint surfaces of the guide member 60 and the piston 30 which face each other have approximately quadrangular shapes.

Meanwhile, since the guide member 60 needs to be fixed so as not to rotate inside the cylinder 21 of the caliper housing 20, a means for fixing the guide member 60 to the caliper housing 20 is required.

Figure 7:
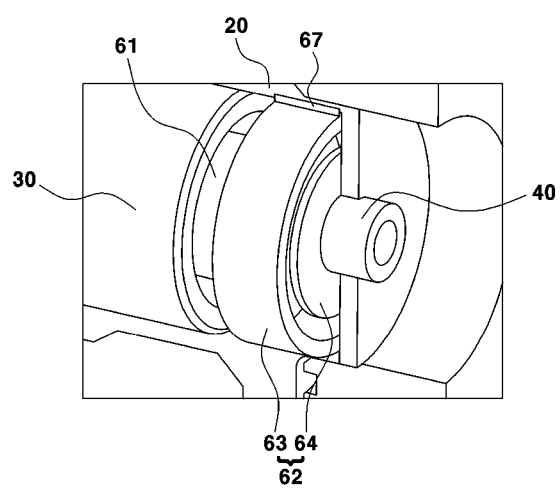
FIG. 7 is a perspective view illustrating a state in which a part of a caliper housing of the electromechanical brake according to the exemplary embodiment of the present disclosure is removed.
Figure 8A:
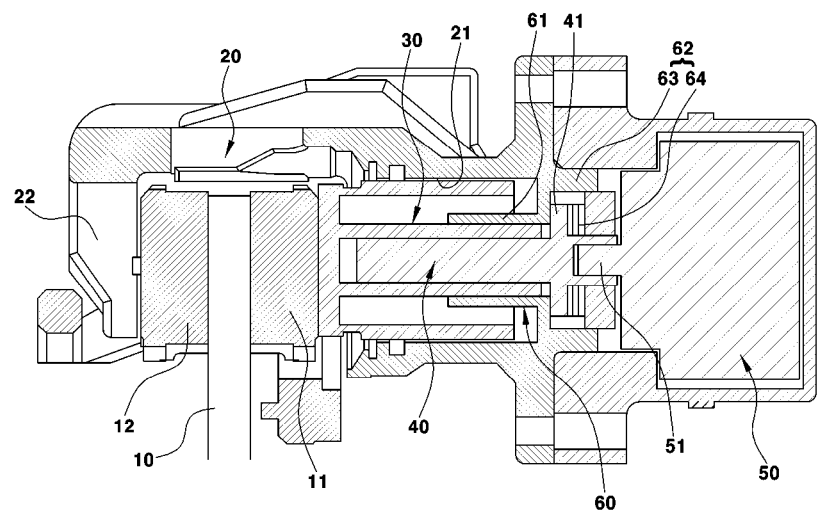
FIGS. 8A and 8B are views illustrating an example in which a guide member is formed integrally with the caliper housing in the electromechanical brake according to the exemplary embodiment of the present disclosure.
Figure 8B:
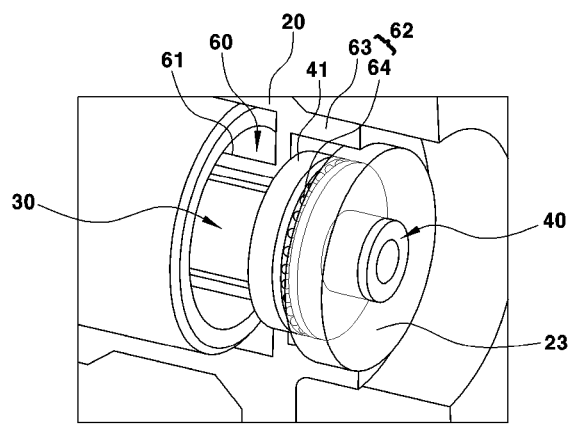
Figure 9:
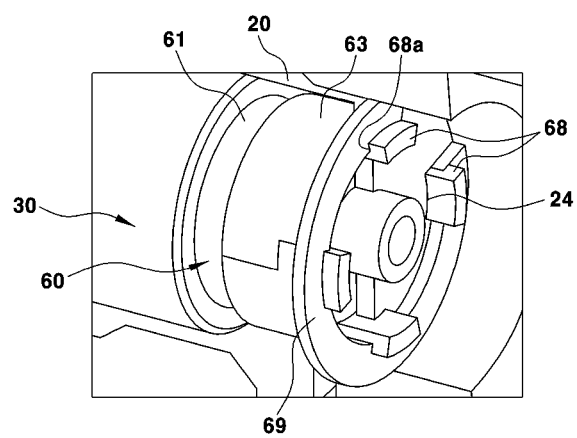
FIG. 9 is a view illustrating an example in which the guide member is fixed by penetrating the caliper housing in the electromechanical brake according to the exemplary embodiment of the present disclosure.

FIGS. 7 and 9 illustrate an example in which the guide member 60 is manufactured as a separate element and then fixed by being assembled to the caliper housing 20, and FIGS. 8A and 8B illustrate an example in which the guide member 60 is formed integrally with the caliper housing 20.

First, FIG. 7 is a perspective view illustrating a state in which a part of the caliper housing 20 is removed. A protrusion 67 or a groove (not illustrated) may be formed on an outer surface of the accommodating portion 63 of the guide member 60 which is fixed to the caliper housing 20, and as a matching structure having the opposite shape, a groove or a protrusion (not illustrated), which may be coupled to the protrusion 67 or the groove of the accommodating portion 63, may be formed in the inner surface of the cylinder 21 of the caliper housing 20.

The protrusion and the groove serve as anti-rotation projections for preventing the guide member 60 from rotating with respect to the caliper housing 20, that is, serve as catching projections in the rotation direction, and instead of the groove or the protrusion, any elements may be applied as long as these elements may be engaged with each other so that the joint surfaces (the outer surface of the accommodating portion and the inner surface of the cylinder) are caught by each other in the rotation direction.

In place of the protrusion and the groove or the elements engaged with each other as described above, the guide member 60 may be press-fitted into the cylinder 21 of the caliper housing 20 to the extent that the guide member 60 cannot rotate, or the guide member 60 and the cylinder 21 may be fixed to each other by using bolts or the like.

Alternatively, as illustrated in FIGS. 8A and 8B, the guide member 60 may also be formed integrally with the caliper housing 20.

In this case, the guide member 60 is formed integrally with the inner surface of the cylinder 21 of the caliper housing 20, and a housing cover 23 for sealing is fixedly installed at an opening portion of the caliper housing 20 which is made to form the guide member 60 integrally with the inner surface of the caliper housing 20.

In this example, the bearing 64 is installed between the housing cover 23 of the caliper housing 20 and the coupling portion 41 of the spindle 40, thereby allowing the coupling portion 41 of the spindle 40 to be rotatably supported by the bearing 64 installed on the housing cover 23.

Alternatively, as illustrated in FIG. 9, a through hole 24 may be formed in the caliper housing 20, a housing through portion 68, which penetrates the caliper housing 20 through the through hole 24, may protrude on the guide member 60, and the housing through portion 68 of the guide member 60 protrudes to the outside in a state in which the housing through portion 68 is penetratively inserted into the through hole 24 of the caliper housing 20, and as a result, the rotation of the guide member 60 may be prevented in a state in which the housing through portion 68 is caught by the through hole 24.

In this case, a plurality of housing through portions 68 is formed on the guide member 60, and the housing through portions 68 of the guide member 60 may be fixed by means of a snap ring 69, which is a ring member, in a state in which the housing through portions 68 of the guide member 60 penetrate the caliper housing 20 through the through hole 24.

That is, as illustrated in the drawings, a catching portion 68a having a bent shape is formed at an end portion of each of the housing through portions 68 positioned outside the caliper housing 20, and the snap ring 69 is installed between the outer surface of the caliper housing 20 and the catching portions 68a of the housing through portions 68, and as a result, the snap ring 69 may prevent the guide member 60 from being separated forward from the interior of the cylinder 21 of the caliper housing 20.

Figure 10:
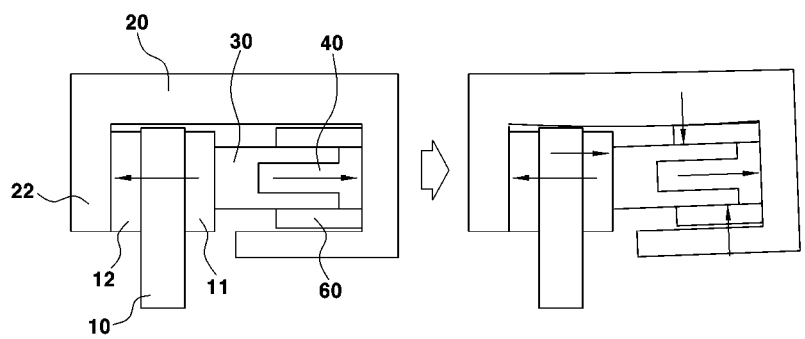
FIG. 10 is a view for explaining a load which is applied to a piston and the guide member due to deformation of the caliper housing in a structure in which the piston and a spindle are directly coupled to each other in the electromechanical brake according to the exemplary embodiment of the present disclosure.

Meanwhile, in the case of the structure in which the piston 30 is directly coupled to the spindle 40, various types of disturbance may be transmitted, and in a case in which rigidity of the caliper housing 20 is insufficient, the caliper housing 20 is deformed (bent) at the time of performing the braking operation as illustrated in FIG. 10, and as a result, an eccentric load is applied to the piston 30 and a load applied to the guide member 60 may be increased.

Therefore, unlike the exemplary embodiment illustrated in FIGS. 3 to 5 in which the piston 30 is configured as a single component interposed between the friction pad 11 and the spindle 40, the piston 30 may be divided into a part for pressing the friction pad 11 and a part coupled to the spindle 40.

Figure 11:
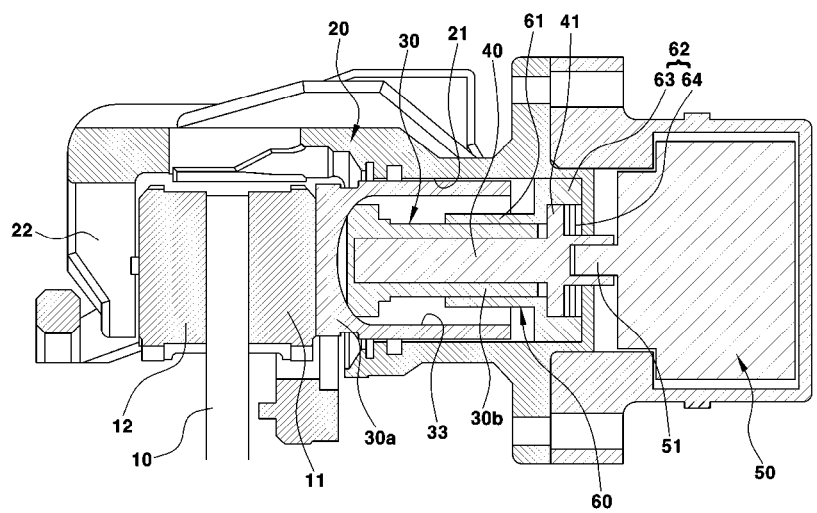
FIGS. 11 and 12 are views illustrating an exemplary embodiment in which a nut member is installed between the piston and the spindle as another exemplary embodiment of the present disclosure.
Figure 12:
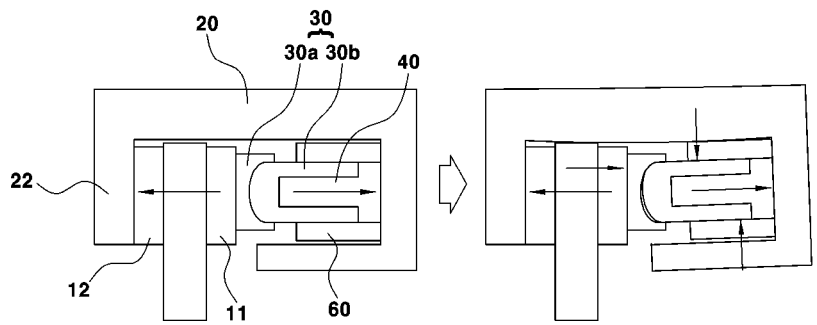

FIGS. 11 and 12 are views illustrating an exemplary embodiment in which the piston 30 is divided into two components, that is, a piston member 30a and a nut member 30b. As illustrated, in the present exemplary embodiment, the piston 30 includes the piston member 30a which presses the friction pad 11 in a state of being in direct contact with the friction pad 11 and generates force for pressing the disc, and the nut member 30b which is thread-coupled to the spindle 40 and converts rotational motion of the spindle 40 into translational motion.

The nut member 30b is coupled to the piston member 30a inside the cylinder 21 of the caliper housing 20, and thread-coupled to the spindle 40.

To this end, screw threads are processed and formed on an inner circumferential surface of the nut member 30b, and screw threads, which may be thread-coupled to the nut member 30b, are processed and formed on an outer circumferential surface of the spindle 40, and as a result, when the spindle 40 rotates, the nut member 30b may move forward and backward in the axial direction (move straight forward and backward) because of the thread-coupling structure, and in this case, the piston member 30a, together with the nut member 30b, may move forward and backward in the axial direction.

In summary, the spindle 40 is thread-coupled to the interior of the nut member 30b, and as a result, rotational force of the spindle 40 may be converted into forward and backward translational force of the nut member 30b.

When the nut member 30b moves forward and backward in the axial direction, the nut member 30b moves straight forward and backward in the axial direction by being guided by the guide member 60, and the piston member 30a is installed between the friction pad 11 and the nut member 30b and transmits translational force of the nut member 30b to the friction pad 11.

In a case in which the separate nut member 30b is used as described above, the nut member 30b coupled to the piston member 30a is thread-coupled to the spindle 40, and as a result, rotational motion of the spindle 40 is converted into translational motion of the nut member 30b, and the nut member 30b, together with the piston member 30a coupled to the nut member 30b, moves forward and backward in the axial direction.

The configuration in which the integrally formed piston 30 is coupled to the guide member 60 has been described in the exemplary embodiment illustrated in FIGS. 3 to 5, but in the exemplary embodiment illustrated in FIGS. 11 and 12 in which the nut member 30b is used, the nut member, instead of the integrally formed piston 30, is coupled to the guide member 60 by the same coupling manner and structure as those of the piston and the guide member which have been described above.

The coupling structure between the piston member 30a and the nut member 30b will be described in more detail. The piston member 30a has a hollow portion 33 which is formed in the piston member 30a so as to be elongated in the axial direction (longitudinal direction), and the nut member 30b is inserted, installed and coupled into the hollow portion 33 of the piston member 30a.

The nut member 30b has an elongated cylindrical shape, a tip portion of the nut member 30b is constructed to be in contact with an inner surface of the hollow portion 33 of the piston member 30a, and a surface of the tip portion of the nut member 30b and the inner surface of the hollow portion 33 of the piston member 30a, which abuts on the surface of the tip portion of the nut member 30b, may be formed as curved surfaces, as illustrated in FIGS. 11 and 12.

That is, a curved-surface-contact manner, in which both contact surfaces of the nut member 30b and the piston member 30a, which are in contact with each other, are formed as curved surfaces, is applied.

In the exemplary embodiment illustrated in FIGS. 11 and 12, the piston member 30a and the nut member 30b may move relative to each other, and as a result, it is possible to enhance an effect of blocking a disturbance and prevent an increase in load applied to the guide member 60.

In the exemplary embodiment illustrated in FIGS. 11 and 12 in which the separate nut member 30b is applied as described above, the coupling structure between the piston and the spindle and the coupling structure between the piston member and the guide member, which have been described in the exemplary embodiment illustrated in FIGS. 3 to 5, are equally applied to a coupling structure between the nut member 30b and the spindle 40 and a coupling structure between the nut member 30b and the guide member 60.

That is, the nut member 30b is thread-coupled to the spindle 40 in a state in which the spindle 40 is inserted into the nut member 30b, and the nut member 30b is coupled to the guide member 60 in a state in which the nut member 30b is accommodated in the guide member 60, such that the rotation of the nut member 30b is restricted by the guide member 60, and simultaneously, the forward and backward axial movement of the nut member 30b is guided.

Figure 13:
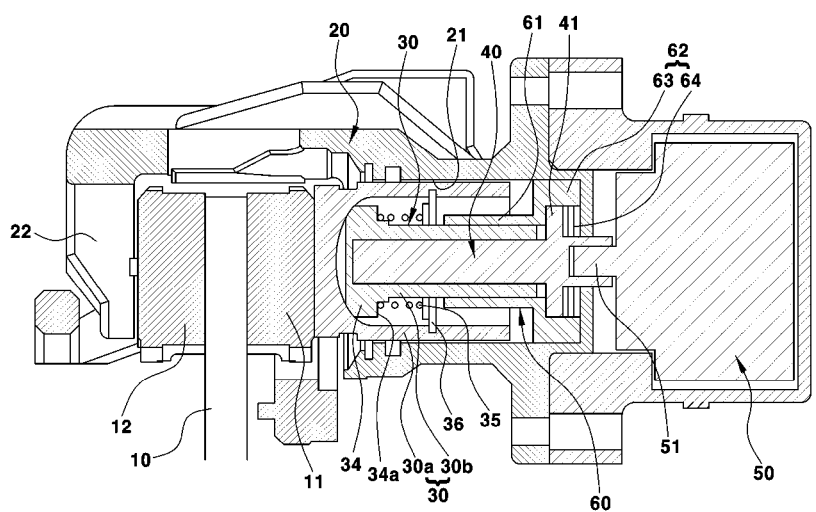
FIG. 13 is a cross-sectional view illustrating an electromechanical brake including a shock absorbing structure between the piston and the nut member as yet another exemplary embodiment of the present disclosure.

FIG. 13 is a view illustrating yet another exemplary embodiment in which the configuration illustrated in FIGS. 11 and 12 is modified. As illustrated, in a case in which the piston member 30a and the nut member 30b are configured as separate components, a shock absorbing structure, which may absorb impact and mitigate impact loads between components in the electromechanical brake, may be further provided.

That is, the shock absorbing structure is configured by using a spring 35 installed between the piston member 30a and the nut member 30b, and the shock absorbing structure serves to reduce noise and vibration as well as to absorb impact and mitigate impact loads.

The configuration will be described in detail. As illustrated in FIG. 13, a head portion 34, which is in contact with the inner surface of the hollow portion 33 of the piston member 30a, is formed at the tip portion of the nut member 30b.

In order to always maintain the head portion 34 of the nut member 30b in contact with the inner surface of the hollow portion 33 of the piston member 30a, the spring 35, which provides elastic restoring force in a direction in which the inner surface of the hollow portion 33 of the piston member 30a comes into contact with the head portion 34 of the nut member 30b, is installed between the piston member 30a and the nut member 30b.

In this case, the head portion 34 has a shape extending and protruding in the radial direction from the tip portion of the nut member 30b, and with the protruding shape, a support end 34a, which may support the spring 35, is provided on the head portion 34 of the nut member 30b.

A ring-shaped spring support plate 36, which is disposed in the rear of the head portion 34 of the nut member 30b, is fixedly installed in the inner surface of the hollow portion 33 of the piston member 30a, and the spring 35 is installed between the head portion 34 of the nut member 30b (in more detail, the support end of the head portion) and the spring support plate 36 in a state in which the nut member 30b is assembled to pass through the interior of the spring support plate 36.

The elastic restoring force of the spring 35, which is compressed and interposed between the head portion 34 of the nut member 30b and the spring support plate 36, serves as force that brings the inner surface of the hollow portion 33 of the piston member 30a into contact with the head portion 34 of the nut member 30b.

The configuration of the electromechanical brake according to the exemplary embodiment of the present disclosure has been described above, and hereinafter, an operation of the electromechanical brake will be described with reference to FIG. 5.

First, when forward rotational force is transmitted to the spindle 40 from the actuator 50, in more detail, when the motor rotates forward and the gear assembly connected with the motor transmits the forward rotational force to the spindle 40, the spindle 40 rotates forward.

In this case, the piston 30 thread-coupled to the spindle 40 moves forward in the axial direction toward the disc 10.

In a case in which the separate nut member 30b is used, the nut member 30b thread-coupled to the spindle 40 moves forward in the axial direction, and thus the piston 30 also moves forward in the axial direction toward the disc 10.

Therefore, clamping force is generated between the disc 10 and the friction pads 11 and 12, and braking force is generated.

In contrast, when reverse rotational force is transmitted to the spindle 40 from the actuator 50, in more detail, when the motor rotates reversely and the gear assembly connected with the motor transmits the reverse rotational force to the spindle 40, the spindle 40 rotates reversely.

In this case, the piston 30 thread-coupled to the spindle 40 moves straight backward in a direction in which the piston 30 moves away from the disc 10, and the clamping force disappears between the disc 10 and the friction pads 11 and 12, such that braking force is released.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An electromechanical brake comprising:
a piston installed in a caliper housing so as to be movable forward and backward in an axial direction, and moves forward in the axial direction at the time of performing a braking operation so as to press a friction pad provided to clamp a disc;
an actuator which provides rotational force for moving the piston;
a spindle which is thread-coupled to the piston, and rotates by rotational force transmitted from the actuator so as to move the piston forward and backward in the axial direction; and
a guide member which is provided to be integrally fixed to the caliper housing and coupled to the piston so as to restrict rotation of the piston and guide forward and backward axial movement of the piston,
wherein the guide member is located outside the spindle,
wherein the guide member has a shape that accommodates and surrounds the piston, and
wherein a coupling portion, which is supported in the axial direction by a support portion of the guide member, is formed on the spindle, and the coupling portion has a shape extending and protruding in a radial direction from the spindle.

2. The electromechanical brake of claim 1, wherein transverse cross sections of joint surfaces of the guide member and the piston are shaped so that the guide member restricts the rotation of the piston.

3. The electromechanical brake of claim 1, wherein a protrusion is formed on the guide member, and a groove into which the protrusion is inserted is formed in the piston so as to be elongated in a longitudinal direction of the piston, such that the guide member restricts the rotation of the piston and the forward and backward axial movement of the piston is guided in a state in which the protrusion is inserted into the groove.

4. The electromechanical brake of claim 1, wherein a protrusion is formed on the piston, and a groove into which the protrusion is inserted is formed in the guide member so as to be elongated in a longitudinal direction of the guide member, such that the guide member restricts the rotation of the piston and the forward and backward axial movement of the piston is guided in a state in which the protrusion is inserted into the groove.

5. The electromechanical brake of claim 1, wherein the piston and the spindle are installed in a hollow cylinder formed in the caliper housing, and the guide member is coupled and fixed to the caliper housing in an assembled manner so as not to rotate in the cylinder.

6. The electromechanical brake of claim 5, wherein a protrusion or a groove is formed on an outer surface of the guide member, and a groove or a protrusion, which is coupled to the protrusion or the groove and has the opposite shape, is formed in an inner surface of the cylinder of the caliper housing so that the guide member does not rotate in the cylinder of the caliper housing.

7. The electromechanical brake of claim 5, wherein a through hole is formed in the caliper housing, and a housing through portion, which is penetratively coupled to the through hole, is formed on the guide member so that the guide member does not rotate in the cylinder of the caliper housing, such that the rotation of the guide member is prevented in a state in which the housing through portion is penetratively coupled to the through hole.

8. The electromechanical brake of claim 7, wherein a plurality of housing through portions is formed on the guide member, a catching portion is formed at an end portion of each of the housing through portions positioned outside the caliper housing, and a ring member is installed between the catching portions of the housing through portions and an outer surface of the caliper housing so as to prevent the guide member from being separated from the caliper housing.

9. The electromechanical brake of claim 1, wherein the piston and the spindle are installed in a hollow cylinder formed in the caliper housing, and the guide member is integrally formed on an inner surface of the cylinder.

10. The electromechanical brake of claim 9, wherein a housing cover for sealing is fixedly installed at an opening portion of the caliper housing which is made to form the guide member integrally with the inner surface of the cylinder of the caliper housing.

11. The electromechanical brake of claim 1, wherein the support portion of the guide member includes:
    an accommodating portion, which has a shape that accommodates the coupling portion of the spindle, is formed on the guide member, and supports, at the front side of the coupling portion, the coupling portion of the spindle accommodated in the accommodating portion; and
    a bearing which is installed, inside the accommodating portion of the guide member, between the coupling portion of the spindle and an inner surface of the caliper housing in the rear of the coupling portion, and supports the coupling portion of the spindle so that the coupling portion is rotatable inside the caliper housing at the rear side of the coupling portion.

12. The electromechanical brake of claim 1, wherein the guide member has a support portion which is coupled to the spindle and supports the spindle in the axial direction.

13. The electromechanical brake of claim 12, wherein a coupling portion, which is supported in the axial direction by the support portion of the guide member, is formed on the spindle, and the coupling portion has a shape extending and protruding in a radial direction from the spindle.

14. The electromechanical brake of claim 13, wherein the support portion of the guide member includes:
    an accommodating portion, which has a shape that accommodates the coupling portion of the spindle, is formed on the guide member, and supports, at the front side of the coupling portion, the coupling portion of the spindle accommodated in the accommodating portion; and
    a bearing which is installed, inside the accommodating portion of the guide member, between the coupling portion of the spindle and an inner surface of the caliper housing in the rear of the coupling portion, and supports the coupling portion of the spindle so that the coupling portion is rotatable inside the caliper housing at the rear side of the coupling portion.

15. The electromechanical brake of claim 1, wherein the piston includes:
    a piston member which is a part for pressing the friction pad; and
    a nut member which is integrally coupled to the piston member so as to be movable forward and backward in the axial direction and thread-coupled to the spindle, and converts rotational force of the spindle into translational force for the forward and backward axial movement.

16. The electromechanical brake of claim 15, wherein the piston member has a hollow portion formed in the axial direction, the nut member is inserted and coupled into the hollow portion of the piston member, and a surface of a tip portion of the nut member, which is inserted into the hollow portion of the piston member, and an inner surface of the hollow portion of the piston member, which abuts on the surface of the tip portion of the nut member, are formed as curved surfaces, such that the nut member and the piston member are in contact with each other through the curved surfaces.

17. The electromechanical brake of claim 15, wherein the piston member has a hollow portion formed in the axial direction, the nut member is inserted and coupled into the hollow portion of the piston member, and a spring, which provides elastic restoring force in a direction in which a tip portion of the nut member comes into contact with an inner surface of the hollow portion of the piston member, is installed, inside the hollow portion of the piston member, between the piston member and the nut member.

18. The electromechanical brake of claim 17, wherein a head portion, which is in contact with the inner surface of the hollow portion of the piston member, is formed at the tip portion of the nut member so as to have a shape extending and protruding in the radial direction, a ring-shaped spring support plate, which is disposed in the rear of the head portion of the nut member, is fixedly installed in the inner surface of the hollow portion of the piston member, and the spring is installed between the head portion at the front side of the spring support plate and the spring support plate at the rear side of the head portion in a state in which the nut member is coupled to pass through the interior of the spring support plate.

* * * * *